United States Patent [19]

Hert et al.

[11] Patent Number: 4,563,504
[45] Date of Patent: Jan. 7, 1986

[54] PROPYLENE AND ETHYLENE/α-OLEFIN COPOLYMER COMBINATIONS APPLICABLE TO THE MANUFACTURE OF MONO-ORIENTED YARNS

[75] Inventors: Marius Hert, Aubingy en Artois; Philippe Dufossé, Bethune, both of France

[73] Assignee: Societe Chimique des Charbonnages, S.A., Paris, France

[21] Appl. No.: 509,723

[22] Filed: Jun. 30, 1983

[30] Foreign Application Priority Data

Jun. 30, 1982 [FR] France ................................ 82 11450

[51] Int. Cl.$^4$ .......................... C08J 5/00; C08L 23/12; C08L 23/20; C08L 23/08
[52] U.S. Cl. .................................................... 525/240
[58] Field of Search ........................................ 525/240

[56] References Cited

U.S. PATENT DOCUMENTS

| | | | |
|---|---|---|---|
| 3,254,139 | 5/1966 | Anderson et al. | 525/240 |
| 3,328,486 | 6/1967 | Croom et al. | 525/88 |
| 3,358,053 | 12/1967 | Hostetler | 525/88 |
| 3,426,105 | 2/1969 | Christensen | 525/232 |
| 3,819,769 | 6/1974 | Pirot | 525/240 |
| 4,205,021 | 5/1980 | Morita et al. | 526/348.5 |
| 4,277,578 | 7/1981 | Yoshimura et al. | 525/222 |
| 4,302,557 | 11/1981 | Yoshimura et al. | 525/221 |
| 4,336,350 | 6/1982 | Yoshimura et al. | 525/246 |

FOREIGN PATENT DOCUMENTS

| | | |
|---|---|---|
| 48227 | 3/1982 | European Pat. Off. . |
| 52557 | 5/1982 | European Pat. Off. . |
| 1316312 | 4/1963 | France . |

Primary Examiner—Carman J. Seccuro
Attorney, Agent, or Firm—Finnegan, Henderson, Farabow, Garrett & Dunner

[57] ABSTRACT

A combination of at least one propylene polymer and at least one ethylene/α-olefin copolymer wherein the combination comprises: (a) 10 to 40 weight percent isotactic polypropylene; and (b) 60 to 90 weight percent ethylene/α-olefin copolymer, wherein said α-olefin has at least 4 carbon atoms, and wherein said copolymer has a density between 0.905 and 0.940 g/cm$^3$ and a melt index between 0.2 and 3 dg/min. Application to the manufacture of mono-oriented yarns.

8 Claims, No Drawings

PROPYLENE AND ETHYLENE/α-OLEFIN COPOLYMER COMBINATIONS APPLICABLE TO THE MANUFACTURE OF MONO-ORIENTED YARNS

BACKGROUND OF THE INVENTION

The present invention relates to combinations of polypropylene and ethylene/α-olefin copolymers and their application in the manufacture of mono-oriented yarns.

A process has been known for several years for the manufacture of sacks for the packaging of commodities as varied as fertilizers, chemical products, animal feedstuffs, cereals, flour, sugar, grains and seeds. This process consists in extruding polypropylene granules through an extruder, and then cooling and slitting the film thus obtained into bands. The bands are reheated in a hot air oven and then drawn on rolls, thereby producing a flat yarn called drawn tape. The drawn tape is stabilized by passing it through a second hot air oven and the stabilized drawn tape is wound in the form of reels and finally woven into sacking cloth from these reels. The sacks thus obtained have good properties of strengh, lightness, imputrescibility and dimensional stability.

French Pat. No. 1,316,312 describes compositions, suitable for the coating of copper wires, comprising 2 to 75 weight percent polypropylene (with a density of 0.87–0.92 g/cm$^3$) and 25 to 95 weight percent of a copolymer of ethylene and an unsaturated terminal bond hydrocarbon containing more than 3 carbon atoms. The copolymer has a density between 0.90 and 0.96 g/cm$^3$, the content of the hydrocarbon in the copolymer is between 0.1 and 50 weight percent, and the compositions have a melt index between 0.005 and 5.

The industry that manufactures woven sacks for packaging is continually searching for new materials having improved properties, especially improved tenacity.

The present invention comprises ethylene/α-olefin copolymers which, in combination with polypropylene, make possible the manufacture of mono-oriented yarns under better conditions and with improved properties in relation to the two constituents of the combination.

SUMMARY OF THE INVENTION

An object of the present invention is to provide combinations suitable for use in preparing mono-oriented yarns.

An additional object of the invention is to provide mono-oriented yarns having superior properties.

Additional objects and advantages of the invention will be set forth in part in the description that follows, and in part will be obvious from the description or may be learned by practice of the invention. The objects and advantages of the invention may be realized and attained by means of the combinations particularly pointed out in the appended claims.

To achieve the foregoing objects and in accordance with the purpose of the invention, as embodied and broadly described herein, the invention comprises:

A combination of at least one propylene polymer and at least one ethylene/α-olefin copolymer wherein the combination comprises: (a) 10 to 40 weight percent isotactic polypropylene; and (b) 60 to 90 weight percent ethylene/α-olefin copolymer, wherein the α-olefin has at least 4 carbon atoms, and wherein the copolymer has a density between 0.905 and 0.940 g/cm$^3$ and a melt index between 0.2 and 3 dg/min.

DESCRIPTION OF THE PREFERRED EMBODIMENTS

Reference will now be made in detail to the presently preferred embodiments of the invention.

The average content of α-olefin units in the copolymer is between 1 and 8 mole percent. The copolymer contains crystalline fractions and amorphous fractions and the distribution of the α-olefin units in the copolymer is heterogeneous. The content of α-olefin units in the copolymer varies between at least 0.2 and at most 5 times their average content according to the fractions considered. These copolymers of a special structure, which are described in European Patent Application No. 0,070,220, may also have crystalline fractions that show a single melting peak between 116° C. and 130° C. and represent from 20 to 50 weight percent of the total copolymer. They may also be characterized in that their overall unsaturation ratio is between 0.25 and 0.50 double bonds per 1,000 carbon atoms.

In the description that follows, the term copolymer will be used to designate both binary polymers comprising one α-olefin in addition to the ethylene, and ternary polymers comprising two α-olefins in addition to ethylene. These copolymers also have an average molecular weight between 15,000 and 60,000 and/or a polydispersity index between 3 and 9 for binary polymers, and between 4 and 12 for ternary polymers.

In the preceding definition, as is conventional in polymer technology, the average molecular weight is the number average molecular weight, Mn, and the polydispersity index is the ratio of the weight average molecular weight to the number average molecular weight, Mw/Mn.

Furthermore, the α-olefins which can form part of the heterogeneous copolymers of the invention include, for example, but-1-ene, hex-1-ene, 4-methyl pent-1-ene or oct-1-ene. When two α-olefins are present simultaneously in the copolymer of the invention (in the case of a terpolymer) their total average content is, as described earlier, between 1 and 8 mole percent and the ratio of their respective average contents is preferably between 0.25 and 4. Thus for example an ethylene/but-1-ene/-hex-1-ene terpolymer of the invention containing an average of 95 mole percent ethylene units may contain an average of from 1 to 4 mole percent of but-1-ene units and an average of from 4 to 1 mole percent hex-1-ene units.

"Isotactic polypropylene," which may be used in the present invention, means homopolymers of propylene and propylene-ethylene copolymers containing less than 10 mole percent ethylene derived units, having a melt index (determined according to the standard ASTM D 1238-73) between 0.5 and 10 dg/min.

The two types of polymers present as components in the combinations of the invention can be prepared without difficulty by any of the techniques of mixing polymers, particularly the blending of granules in the solid state at ambient temperature and blending in the molten state under the influence of heat.

The combinations of the invention make it possible to manufacture, by the technique described previously, mono-oriented yarns under better conditions and with properties which are improved compared to the mono-oriented yarns prepared by starting from each polymer of the combination. These mono-oriented yarns stand out especially for the draw ratio employed in their manufacture and for their tenacity.

The mono-oriented yarns obtained from the invention find numerous applications in the packaging industry, in the form of woven sacks.

The following examples demonstrate some preferred embodiments of the invention but do not imply any limitation on the scope of the invention.

EXAMPLE 1

A copolymer comprising an ethylene/but-1-ene copolymer with a melt index (measured according to the standard ASTM D 1238-73) of 0.8 dg/min, a density (measured according to the French Standard T 51-063) of 0.919 g/cm$^3$, a number average molecular weight (measured by gel permeation chromatography) of 43,000, and a polydispersity index, Mw/Mn, of 3.6, and having an average molar content of but-1-ene units of 3.2%, and a crystalline fraction melting point (determined by differential thermal analysis) of 122° C., wherein the heterogeneity of the distribution of but-1-ene (determined by a copolymer fractionation test) is expressed by the multiple (2.2 times) and the submultiple (0.5 times) of the average content between which the content of the but-1-ene units varies according to the fractions considered, is obtained according to example 5 of European Patent Application No. 0,070,220.

20 parts by weight of a propylene/ethylene copolymer obtained in the presence of a Ziegler-type catalyst, having a density of 0.905 g/cm$^3$, a melt index of 4 dg/min (determined according to standard ASTM D 1238-73) and with a modulus of rigidity (determined according to standard ASTM D 790) of 10,300 kgf/cm$^2$ is added to 80 parts by weight of the above ethylene/but-1-ene copolymer, and the combination is converted into mono-oriented yarns called drawn tapes, by the method described above.

Table I below shows the weight percentage of the ethylene/but-1-ene copolymer (% (A)), the draw ratio, and the result of the measurement of the tenacity of mono-oriented yarns, expressed in grams per denier and determined according to the AFNOR standard specification.

EXAMPLES 2 AND 3 (COMPARATIVE)

The pure ethylene/but-1-ene copolymer (Example 2) and the pure propylene/ethylene copolymer (Example 3) of Example 1 are converted into mono-oriented yarns called drawn tapes, by the same method as that in Example 1. In Table I below the draw ratio and the result of measurement of the tenacity according to the same method are shown.

TABLE I

| Example | % (A) | Draw Ratio | Tenacity |
|---------|-------|------------|----------|
| 1 | 80 | 11 | 5.3 |
| 2 | 100 | 8 | 4.1 |
| 3 | 0 | 12 | 4.9 |

It will be apparent to those skilled in the art that various modifications may be made in the combination of the invention without departing from the scope or spirit of the invention.

What is claimed is:

1. A mono-oriented yarn having improved tenacity produced from combination of at least one propylene polymer and at least one ethylene/α-olefin copolymer wherein said combination comprises: (a) 10 to less than 40 weight percent isotactic polypropylene; and (b) 60 to 90 weight percent ethylene/α-olefin copolymer, wherein said α-olefin has at least 4 carbon atoms, wherein said copolymer has a density between 0.905 and 0.940 g/cm$^3$ and a melt index between 0.2 and 3 dg/min, wherein said copolymer comprises crystalline and amorphous fractions, wherein the average content of said α-olefin units in said copolymer is between 1 and 8 mole percent, wherein the distribution of said α-olefin units in said copolymer is heterogeneous, and wherein the content of α-olefin units in said copolymer varies between at least 0.2 and at most 5 times the average content of α-olefin units, depending on the fractions considered.

2. The combination of claim 1, wherein said isotactic polypropylene has a melt index of between 0.5 and 10 dg/min.

3. The combination of claim 1, wherein said crystalline fractions of said copolymer have a single melting peak between 116° C. and 130° C. and represent from 20 to 50 weight percent of the total copolymer.

4. The combination of claim 1, wherein said ethylene/α-olefin copolymer has a molecular weight between 15,000 and 60,000.

5. The combination of claim 1, wherein said copolymer comprises a single α-olefin, and wherein the polydispersity index of said copolymer is between 3 and 9.

6. The combination of claim 1, wherein said copolymer comprises two α-olefins having a ratio of respective average contents between 0.25 and 4.

7. The combination of claim 6, wherein said copolymer has a polydispersity index between 4 and 12.

8. The combination of claim 1, wherein said isotactic polypropylene is a propylene/ethylene copolymer comprising less than 10 mole percent derived ethylene units.

* * * * *

UNITED STATES PATENT AND TRADEMARK OFFICE
CERTIFICATE OF CORRECTION

PATENT NO. : 4,563,504

DATED : January 7, 1986

INVENTOR(S) : Marius HERT et al.

It is certified that error appears in the above-identified patent and that said Letters Patent is hereby corrected as shown below:

Claim 2, column 4, line 33; claim 3, column 4, line 36; claim 4, column 4, line 40; claim 5, column 4, line 43; claim 6, column 4, line 46; claim 7, column 4, line 49; and claim 8, column 4, line 51, change "The combination of claim 1" to --The mono-oriented yarn of claim 1--.

Signed and Sealed this

Fourth Day of November, 1986

[SEAL]

*Attest:*

DONALD J. QUIGG

*Attesting Officer*  Commissioner of Patents and Trademarks